(12) United States Patent
Ridge

(10) Patent No.: US 7,106,908 B2
(45) Date of Patent: Sep. 12, 2006

(54) METHOD AND APPARATUS FOR SELECTING A FORMAT IN WHICH TO RE-ENCODE A QUANTIZED IMAGE

(75) Inventor: Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 914 days.

(21) Appl. No.: 10/097,185

(22) Filed: Mar. 12, 2002

(65) Prior Publication Data

US 2003/0174896 A1 Sep. 18, 2003

(51) Int. Cl.
*G06K 9/36* (2006.01)
(52) U.S. Cl. .................................................. 382/239
(58) Field of Classification Search ................ 709/217, 709/218; 345/418, 592; 715/744, 752; 375/240.25; 348/14.12, 14.13; 358/402, 482, 530; 382/100, 382/232, 239, 240, 243; 341/51
See application file for complete search history.

(56) References Cited

U.S. PATENT DOCUMENTS

| 5,867,112 | A | * | 2/1999 | Kost ............................ 341/51 |
| 6,025,931 | A | * | 2/2000 | Bloomfield ................. 358/402 |
| 6,167,442 | A | * | 12/2000 | Sutherland et al. ......... 709/217 |
| 6,211,881 | B1 | * | 4/2001 | Gabler et al. ............... 345/418 |
| 6,509,910 | B1 | * | 1/2003 | Agarwal et al. ............. 715/752 |
| 6,597,811 | B1 | * | 7/2003 | Batkilim et al. ............. 382/232 |
| 6,825,876 | B1 | * | 11/2004 | Easwar et al. .............. 348/234 |

OTHER PUBLICATIONS

"JPEG: Still Image Data Compression Standard", W.B. Pennebaker and J.L. Mitchell, Chapman and Hall, 1992, ISBN 0442012721, pp. 171-172.

* cited by examiner

*Primary Examiner*—Jose L. Couso
(74) *Attorney, Agent, or Firm*—Ware, Fressola, Van Der Sluys & Adolphson LLP

(57) ABSTRACT

An apparatus and corresponding method (10) for reencoding an input image already encoded in some format in order to provide a possibly more suitable encoding, based on whether the input image is determined by the system to be a graphic image (i.e. an artificial image) or a natural image (i.e. for example photographs of real world objects). The invention uses a decision function (f) having some predetermined parameters ($\alpha,\beta,\lambda$) that are constant or are changed only occasionally so as to refine their values, and also uses some inputs (c,r,d) that correlate in some way with the naturalness of an image and are determined by analyzing the input image using several analyzer modules (11a 11b 11c). The value of the decision function (f) is compared to a threshold, or two various thresholds in a table (12c) of thresholds versus predetermined formats, to decide on what format to use to reencode the image.

21 Claims, 3 Drawing Sheets

METHOD AND APPARATUS FOR SELECTING A FORMAT IN WHICH TO RE-ENCODE A QUANTIZED IMAGE

FIELD OF THE INVENTION

The present invention pertains to the field of image processing, and more particularly to the selection of a compression format to be used when encoding an image.

BACKGROUND OF THE INVENTION

A digital image in uncompressed form comprises an array of image pixels or picture elements. Each pixel, in turn, is represented by a certain number of bits, which carry information about the brightness (luminance) and/or color (chrominance) of the pixel. Different schemes exist for representing the luminance and/or chrominance of pixels in a digital image. Commonly, a so-called YUV color model is used. The luminance, or Y, component represents the luminance of the pixel, while the color of the pixel is represented by two chrominance or color difference components, labeled U and V. Other color models, such as RGB (Red, Green, Blue) color models, which are based on components representing the three primary colors of light, are also commonly used.

Many systems can encode images, producing a compressed version of the image (for storing the image on a storage media or for communicating the image to another system) in a variety of compressed formats. Each format possesses different intrinsic characteristics, which suit it to particular types of images. For example, two common formats currently in use are GIF (Graphic Interchange Format) and JPEG (Joint Photographic Expert Group) format. GIF is well suited to storing computer-generated graphics, which may contain rasterized text, regions of solid color, and sharp lines. By contrast, the JPEG format is well suited to encoding natural scenes or real world objects, such as provided by photographs of real world scenes or real world objects.

In compression according to the baseline mode of the JPEG standard, an image to be coded/encoded is first divided into an array of non-overlapping square blocks, each block comprising, for example, an 8×8 array of image pixels. In the case of the JPEG baseline, a two-dimensional Discrete Cosine Transform (DCT) is then applied independently to each of the image blocks. This has the effect of converting the image data from the pixel value domain to the spatial frequency domain and to produce a corresponding set of coefficient values, each of which is a weighting factor for a basis function of the two-dimensional DCT. The coefficient values thus produced are quantized and then coded in a lossless manner using entropy coding to further reduce the amount of data (i.e. number of bits) required for their representation. According to the JPEG baseline, the entropy coder employs only Huffman coding to produce a compressed bit-stream, although in other modes arithmetic coding may alternatively be used. Finally, data describing image and coding parameters (e.g. type of compression, quantization and coding tables, image size, etc.) is embedded in the bit-stream produced by the entropy encoder. Embedding the data about the coding is necessary because the JPEG standard comprises four alternative coding modes and places few constraints on the quantization and coding tables that can be used, and so for a JPEG compressed bit-stream to be communicated to a receiving platform and for the image to be reconstructed without any ambiguity by the receiving platform, the receiving platform must know which of the different coding modes was used.

The size of a JPEG file does not depend upon the number of colors in the image provided by the file; rather it depends on the frequency composition of the image, i.e. whether the image includes slow, subtle changes (such as background tones), which have a low frequency, or sharper edge-like changes, which have a high frequency. For example, a photograph of the sky would not have a large high frequency component because it is mostly solid blue. A photograph of a tree would have much more high frequency component because of the edges of the leaves. A graphic (artificial) image often has very sharp edges and thus lots of high frequency component. JPEG is designed to favor low frequency and eliminate most high frequency, because in natural images, the human eye cannot detect high frequency very well. As a result, sharp edges tend to become blurred when a GIF image is encoded as JPEG. Because low frequency components are favored, a photograph of the sky will have a smaller JPEG file size than a photograph of a tree, even if both files might represent the same number of pixels. Additionally, the JPEG file size depends upon the number of pixels in the original image. The relationship, assuming frequency content is static, is proportional. Thus if two images have the same frequency content and one has half as many pixels, the output file size for the one will be half that for the other.

GIF on the other hand does not depend at all upon the frequency content. It depends upon two things: the number of colors in the image, and the "pattern" in which those colors are arranged. Specifically, GIF looks for patterns in the sequence of palette indexes which correspond to the colors of each pixel in the image, stores the patterns in a dictionary, and encodes these patterns rather than the individual indexes. Because of this, GIF is called a dictionary-based scheme. (The term "index" as used here refers to the so-called "palette index" used in GIF, unless otherwise stated. In GIF, the palette index operates in conjunction with a lookup table of colors, called the palette; the palette index for a pixel is used to look up in the palette what color to use for the pixel, i.e. what RGB value to use for the pixel. The palette index serves to indicate characteristics of an image at a particular location in the image, i.e. for a particular pixel of the image.)

With this approach to encoding an image, the size of a GIF image depends largely upon how many indexes are represented by one pattern in the dictionary, and how many times an encountered pattern is found to occur in the dictionary. If there is a large solid region, and one dictionary element can represent many pixels, the compression will be very efficient. By contrast, if there is no real pattern in the image and each dictionary entry can only represent one or two pixels, the compression will not save very much. Since natural images contain varying tones, there are no dominant patterns for such images and so GIF compression is not usually efficient for natural images. In essence, the size of a GIF image depends partly upon the number of colors, and also upon how those colors are arranged in the image.

So, if a GIF image of a natural scene is re-encoded as JPEG, the file size will almost always decrease, and if a GIF image of an artificial scene is re-encoded as JPEG, the file size will often increase unless somehow constrained from doing so. Similarly, if a JPEG image of a natural scene is re-encoded as a GIF, the file size will increase unless it is somehow constrained from doing so. In the final permutation, when an arbitrary JPEG image of an artificial scene is to be re-encoded as a GIF file, the file size cannot be predicted because much depends upon the quality of the initially encoded JPEG image (e.g. how blurred it has become).

Thus, encoding an image in a format less suited to the type of image (natural vs. graphic) can produce undesirable results. For example, encoding a photograph as a GIF image may result in a grainy image having a much larger file size than would be the case if JPEG format were used. Some systems are designed to handle one particular type of image (e.g. digital cameras are designed to store photographs of real world scenes or real world objects) so the choice of which encoding format to use can be reliably predetermined. Other systems, such as personal computers, allow an end user to decide on an encoding format for an image. Still other systems must handle a variety of image types in situations where user input to decide what format to use is either undesirable or impractical. For example, a system that processes a sequence of image types, and is expected to quickly decide on which format to use, is preferably an automated system rather than one that relies on input from an end user, since an end user might take too long to decide or might not be able to be relied on to make the best decision in a high enough percentage of cases. An example of such a system in which the decision is preferably automated is an image conversion server, which is a system that accepts incoming images and converts various properties (resolution, size and bytes, and other properties) to meet predetermined target requirements. Because the content of incoming images may vary widely, and because many images need to be processed quickly, an automated method of selecting the appropriate encoding format is desirable.

So what is needed is an automated system for choosing, from among a predetermined set of formats, a suitable format for encoding or re-encoding an image, an automated system that preferably is able to process a sequence of images so as to determine a suitable encoding format for each in a time acceptable for real world applications.

SUMMARY OF THE INVENTION

Accordingly, in a first aspect of the invention, a method is provided for selecting a format in which to re-encode an input formatted image, the method characterized by: an analysis step of analyzing the input formatted image to provide information indicating whether characteristics of the input formatted image correspond to a natural image or to a graphic image; and a decision step of deciding on and providing which format from among at least two predetermined formats to use to re-encode the input formatted image, based on the information indicating whether characteristics of the input formatted image correspond more to a natural image or more to a graphic image.

In accordance with the first aspect of the invention, the analysis step may include at least one of the following steps: a step of examining the input to determine the number of colors; a step of examining the input to determine the average run length of colors; and a step of examining the input formatted image to determine an edge detection metric. Further, the decision step may use a predetermined function having as an input one or more values corresponding to the information indicating whether characteristics of the input formatted image correspond more to a natural image or more to a graphic image, and may also use at least one threshold value to decide between the at least two predetermined formats and to arrive at a decision as to which of the predetermined formats to use to reencode the input formatted image. Further still, the decision function may be a function f(c,r,d) able to be expressed as:

$$f(c, r, d) = \frac{\alpha}{c} + \beta r + \lambda d,$$

where c is the number of colors of the input formatted image, r is its average run length, and d is an edge activity metric for the input formatted image, and where $\alpha$, $\beta$ and $\lambda$ are predetermined values, not necessarily non-zero; as an alternative, the decision function may be a function f(c,r,d) able to be expressed as:

$$f(c, r) = \begin{cases} 0 & \text{for } c > \alpha \text{ and } r < \beta \\ 1 & \text{otherwise} \end{cases}$$

where, as before, c is the number of colors of the input formatted image, r is its average run length, and $\alpha$ and $\beta$ are predetermined values, not necessarily non-zero. Also further, the at least two predetermined formats may include the JPEG format and GIF.

Still also in accordance with the first aspect of the invention, the method may be further characterized by: a preprocessing step, responsive to the input formatted image, of determining whether the input formatted image was formed from an original color-quantized image, for providing to the analysis module either the input formatted image or a converted image derived from the input formatted image as the input formatted image. Further, the preprocessing step may include a step of determining the naturalness of the input formatted image by scanning differentially encoded DC terms of the input formatted image and comparing the variance of the DC terms to a predetermined threshold. Also further, the preprocessing step may include a step of determining whether colors of a converted image derived from the input formatted image are clustered so as to determine whether the input formatted image was derived from a color-quantized image.

In a second aspect of the invention, an apparatus is provided for selecting a format in which to re-encode an input formatted image, the apparatus characterized by: an analysis module for analyzing the input formatted image to provide information indicating whether characteristics of the input formatted image correspond to a natural image or to a graphic image; and a decision module of deciding on and providing which format from among at least two predetermined formats to use to re-encode the input formatted image, based on the information indicating whether characteristics of the input formatted image correspond more to a natural image or more to a graphic image.

In accordance with the second aspect of the invention, the analysis module may include at least one of the following modules: a module for examining the input to determine the number of colors; a module for examining the input to determine the average run length of colors; and module for examining the input formatted image to determine an edge detection metric. Further still, the decision module may use a predetermined function having as an input one or more values corresponding to the information indicating whether characteristics of the input formatted image correspond more to a natural image or more to a graphic image, and may also use at least one threshold value to decide between the at least two predetermined formats and to arrive at a decision as to which of the predetermined formats to use to reencode the input formatted image. Still further, the decision function may be a function f(c,r,d) able to be expressed as:

$$f(c, r, d) = \frac{\alpha}{c} + \beta r + \lambda d,$$

where c is the number of colors of the input formatted image, r is its average run length, and d is an edge activity metric for the input formatted image, and where α, β and λ are predetermined values, not necessarily non-zero; as one alternative, the decision function may instead be a function f(c,r,d) able to be expressed as:

$$f(c, r) = \begin{cases} 0 & \text{for } c > \alpha \text{ and } r < \beta \\ 1 & \text{otherwise} \end{cases}$$

where c, r, α and β are defined as before. Also still further, the at least two predetermined formats may include the JPEG format and GIF.

Also in accordance with the second aspect of the invention, the apparatus may also include a preprocessing module, responsive to the input formatted image, for determining whether the input formatted image was formed from an original color-quantized image, for providing to the analysis module either the input formatted image or a converted image derived from the input formatted image as the input formatted image. Further, the preprocessing module may include a module for determining the naturalness of the input formatted image by scanning differentially encoded DC terms of the input formatted image and comparing the variance of the DC terms to a predetermined threshold. Also further, the preprocessing module may include a module for determining whether colors of a converted image derived from the input formatted image are clustered so as to determine whether the input formatted image was derived from a color-quantized image.

In a third aspect of the invention, a mobile phone is provided, characterized in that it includes an apparatus as in the second aspect of the invention.

In a fourth aspect of the invention, terminal equipment of a communication system is provided, characterized in that the terminal equipment includes an apparatus as in the second aspect of the invention.

In a fifth aspect of the invention, a computer server is provided, characterized in that the computer server is responsive to computer instructions for performing a method as in the first aspect of the invention.

Thus, the invention provides a simple yet effective method for deciding whether to encode an image in one or another predetermined format, such as a dictionary-based palette format (of which GIF is an example) or a transform-based format (of which the JPEG format is an example). The invention relies on the images it decides how to encode being already encoded in one or another format, e.g. in the GIF format or the JPEG format.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
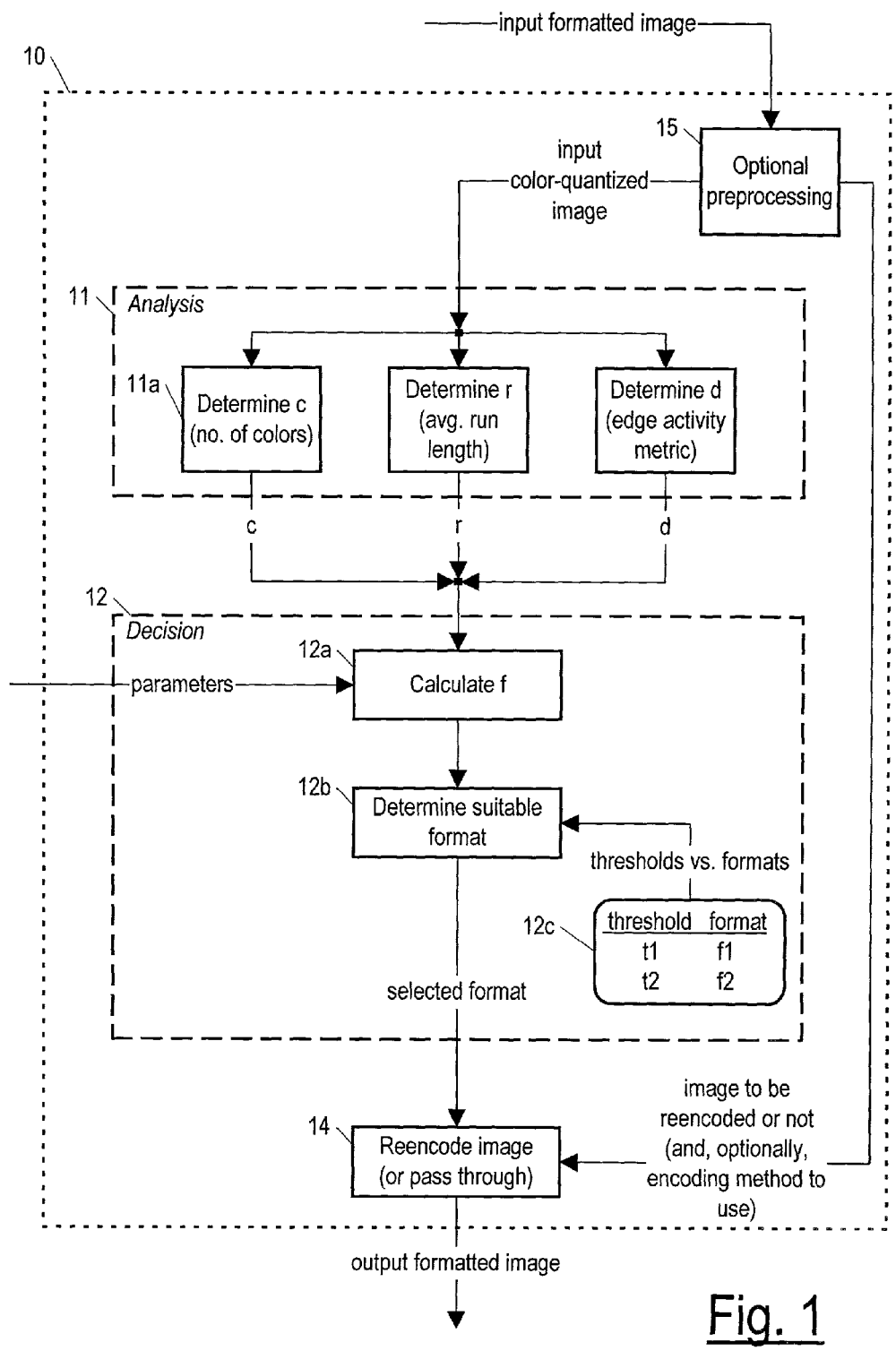
FIG. 1 is a block/flow diagram of the invention assuming an input color-quantized image, i.e. a GIF image (or other equivalent representation)

The invention takes as an input an already encoded image (in any format) and then decides how to reencode the image based on characteristics of the image. The invention is described first for an application in which, if the invention deems an image to be a natural image (such as photographs of real world scenes or real world objects), the invention will choose to reencode the image as a JPEG image, i.e. which is a format suitable for natural images; and if the invention deems an image to be a graphic image (such as computer-generated image or an otherwise artificial image), the invention will choose to reencode the image as a GIF image, i.e. which is a format suitable for graphic images. As explained below, it will be appreciated that the invention encompasses more than deciding between a format for natural images, such as JPEG format, and one for graphic images, such as GIF. The invention also encompasses deciding from among more than two predetermined formats based on characteristics of the image, such as characteristics that correlate with naturalness. Thus, if naturalness is the measuring stick, a pure graphic image might be chosen to be reencoded in GIF, a photograph of a real world object displaying the graphic image (e.g. a logo on a tee-shirt) might be chosen to be reencoded in some intermediate format, and a photograph of an outdoor scene might be chosen to be reencoded in the JPEG format.

The Invention Assuming an Input Color-Quantized Image

The invention is described here for an application in which the input is assumed to be an already color-quantized image, i.e. a GIF image, as opposed to a JPEG formatted image. If the image to be analyzed (the input image) is not a GIF image, for example if it is a JPEG image, preprocessing of the image can be performed to provide it as a GIF image. In an elaboration of the invention, if the format of the input image is arbitrary, preprocessing can be performed to determine whether the image is a GIF image or a JPEG image (or an image according to any other non-color-quantized format, besides a JPEG format). In addition, for JPEG formatted input images, it can be determined whether the JPEG representation was formed from a color-quantized original. If it is determined from the preprocessing that the input image is not color quantized nor formed from a color quantized original, then without performing the analysis described below, the invention would leave the image as a JPEG image.

The invention, in the preferred embodiment, uses a decision function to decide which format to use to reencode an image. The decision function used in the preferred embodiment is a function of three input variables, c,r,d, the values for which are determined by the invention preparatory to evaluating the decision function. The first variable, c, is, equal to the number of colors in the image; the second variable, r, is equal to the average run length of colors in the image (as explained below); and the third variable, d, is equal to an edge activity metric. The values for the three input variables are determined by analyzing the subject image, as described below. The preferred function also includes three parameters (constants) α,β,λ that can act as weights or serve as other than weights (as described below, where one parameter is used as a threshold for a number of colors and another is used as a threshold for an average run length). Preferably, and in a particularly simple embodiment, the decision function can be written as, $$f(c, r, d) = \frac{\alpha}{c} + \beta r + \lambda d, \quad (1)$$

and, as explained below, has lower values for more natural images and higher values for images that are more graphic (artificial). For the decision function of eq. (1), the parameters α,β,λ can be thought of as weighting the importance of the three inputs (characteristics of the image) c,r,d. In an embodiment using eq. (1), and in the preferred embodiment, a threshold value τ is predetermined, and the invention uses that rule that if the decision function f(c,r,d) is less than τ then the graphics format is used, otherwise the natural format is used. In more complex embodiments in which the invention chooses from among more than two formats, a table of thresholds vs. formats is used according to one or another rule, for example according to the rule that if the decision function has a value that is less than one threshold but greater than the preceding threshold, the format corresponding to the preceding threshold is to be used. Thus, for example, in case of three formats, the table of thresholds vs. formats might be as in table 1 below, according to which a decision function value of 0.5 for an image would result in a decision to use JPEG format to reencode the image.

TABLE 1

Example of table of thresholds vs. formats.

| Threshold | Format |
| --- | --- |
| 0 | JPEG format |
| 1 | Some intermediate format |
| 2 | GIF |

Referring now to FIG. 1, an apparatus (or corresponding method) 10 according to the invention is shown as including an analysis module (or a corresponding step) 11, and a decision module (or a corresponding step) 12. The analysis module 11 accepts as input an input color-quantized image, and produces as an output the values for the inputs to the decision function. Then, to determine a value for the decision function, the decision module 12 uses the values of the inputs to the decision function. The decision function itself is predetermined, i.e. it does not depend on the particular image being processed. With the value of the decision function determined, the decision module 12 refers to a table 12c of thresholds versus formats to determine which format is possibly the most suitable format to be used in reencoding the input color-quantized image (at least possibly the most suitable from among the predetermined set of formats provided in the table 12c of thresholds versus formats). The output of the decision module 12 is therefore a format. A subsequent module (or corresponding step) 14 uses the output (i.e. a format) of the decision module 12 and the input color-quantized image to produce a reencoded image, which it then provides as an output formatted image.

Note that although the parameters α,β,λ are referred to here as constants, the invention does comprehend refining or altering the values of the parameters, from time to time, according to experience in a particular application.

To set up to the invention, it is first necessary to pick a function to use for the decision function, such as the function given by eq. (1), then pick values for its parameters, such as the parameters α,β,λ of the function given by eq. (1), and finally, to determine a threshold (or more thresholds if the invention is to decide between more than two formats). In the case of having the invention decide between a format for a natural image and a format for a graphic image, the decision function must be chosen with specific values for its parameters and a threshold must be set so as to provide a value for the decision function f(c,r,d) that maps to a format suitable for a natural image when a natural image is being analyzed (or an image that has the characteristics of a natural image), and maps to a format suitable for a graphic image otherwise. More generally, as mentioned above, a decision function and parameters and thresholds are set so as to provide whatever mapping is desired. For example, a particularly simple graphic image might be encoded in one format, a slightly more complex graphic image in another, a particularly simple natural image (such as a photograph of a real world object bearing a graphic image) in another, and a more complex natural image (such as a photograph of a real world scene or a real world object) by yet another format.

Still referring to FIG. 1, the analysis module/step 11 includes three modules (or corresponding steps), a c analyzer 11a, an r analyzer 11b and a d analyzer 11c. These analysis modules (or the corresponding steps) analyze the input color-quantized image and determine a respective input to the decision function f(c,r,d). The result of the analyses performed by the invention may be that the image should be reencoded as some other format, or that the format in which the image is already encoded is the most suitable of the formats in the table of thresholds versus formats.

Still referring to FIG. 1, the c analyzer 11a provides the first input, c, the number of colors in the input image, simply by determining the size of the palette, i.e. the size of the palette is the number of colors. No further processing or calculation is required.

The r analyzer 11b determines the second input r, the average run-length, by raster-scanning the palette index terms in the color quantized input image, i.e. by examining the (two dimensional) image (an array of pixels) a pixel at a time, starting from one corner and then sweeping across all columns for first the row in which the corner pixel is located, and then for each next row of the array. The number of pixels between index changes is tracked by incrementing a counter for each pixel between changes in the index, and when the index term changes, the run length is added to the total and the counter is reset. This is expressed in the following pseudocode:

```
For y = 1 to image_height
    for x = 1 to image_width
        if pixel at (x,y) <> last_index,
            r1_count = r1_count + 1
            last_index = pixel at (x,y)
            this_r1 = 0
        else
            this_r1 '2 this_r1 + 1
    end
end
r = (image_height*image_width−r1_count)/r1_count.
```

Although measuring in two dimensions (i.e. determining pixel changes for all columns and then for all rows of the array of pixels representing an image, as opposed to raster-scanning) may more accurately reflect regions of solid color in the image, most dictionary-based schemes, including GIF, raster-scan the pixel indexes; therefore, measuring run-length in one dimension, i.e. raster-scanning (which in effect lays the rows of an image end-to-end, treating the two dimensional array of pixels representing the image as a one-dimensional array of pixels), better matches the calculation to the compression scheme.

The calculation of r involves raster-scanning the entire image, and the computation required to determine r is thus proportional to the number pixels in the image. However, the effort required for each iteration is minimal. Speed may be improved by analyzing only a subset of the image, a subset such as one contiguous region or a subsampled version of the region.

Figure 2A:
FIG. 2A is an example of a natural image of the type for which a suitable format might be determined by the invention.
Figure 2B:
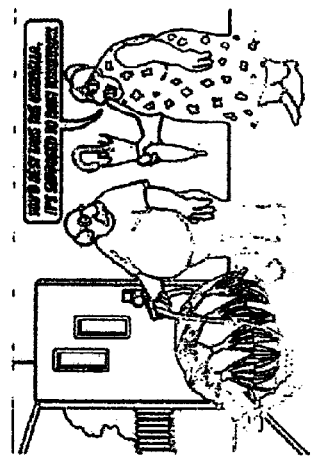
FIG. 2B is a gradient image derived from the image provided as FIG. 2A.
Figure 3A:
FIG. 3A is an example of a graphic image of the type for which a suitable format might be determined by the invention.
Figure 3B:
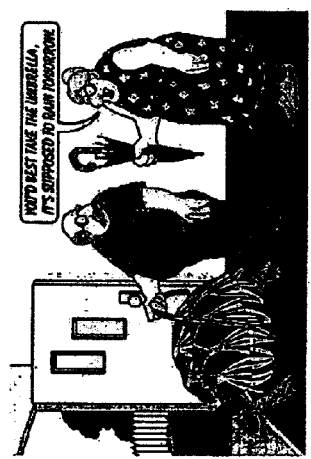
FIG. 3B is a gradient image derived from the image provided as FIG. 3A.

The d analyzer 11*c* determines the third input, d, the edge activity metric, by applying edge detection horizontally, vertically, and/or diagonally so as to produce what is called a gradient image. For example, FIG. 2A shows a natural image and FIG. 2B the corresponding gradient image, whereas FIG. 3A shows a graphic image, and FIG. 3B shows the corresponding gradient image for the graphic image. Edge detection involves viewing the image as a matrix of luminance (i.e. intensity) values, and convolving with a filter matrix. Several good filters are known, such as the Sobel filter $T_s$, which can be written as, $$T_s = \frac{1}{4}\begin{bmatrix} -1 & 0 & 1 \\ -2 & 0 & 2 \\ -1 & 0 & 1 \end{bmatrix},$$

and which would be used as written for the horizontal direction and then transposed for the vertical direction. Another often used filter is the Roberts filter, $T_r$ which can be written as, $$T_r = \begin{bmatrix} 0 & 1 \\ -1 & 0 \end{bmatrix},$$

and which, like the Sobel filter above, would be written as above for the horizontal direction and then transposed for the vertical direction. (The details of edge detection using such filters are known in the art, and are not fully elaborated on here.) The gradient image provides a measure of the rate of change of the index (i.e. the change from one pixel to another). For a natural image, the index change is usually smoother and more continuous than for a graphic image. For a graphic image, one would expect to obtain a sharper gradient image, with areas of no change (representing solid color regions in the original image) and also areas of high intensity points (representing sharp lines). (Compare FIGS. 2B and 3B.)

Finally, after determining the gradient image, in the preferred embodiment, the edge activity metric d is taken to be the variance of the gradient image, given by, $$d = \sigma^2 = \frac{1}{N}\sum_i (p_i - \mu)^2, \tag{2}$$

where the $p_i$ are the pixel values of the gradient image, $\mu$ is the mean of those values, and N is the number of pixels in the image. Unlike the other two inputs, c and r, the edge activity metric d can require a noticeable amount of computation; therefore, it may be advantageous in some applications not to use the edge activity metric.

With r, c and d each determined by the analysis module 11 and provided as an input to the decision module 12, the decision module (or corresponding step) 12 evaluates the decision function f(c,r,d), such as given by eq. (1), and consults the table 12*c* of threshold values versus formats to determine, based on comparing the calculated values of the decision function with the threshold values in the table, which format to use to reencode the input color-quantized image. More particularly, the decision module 12 includes a module (or corresponding step) 12*a* in which the decision function is calculated, and which uses as inputs the parameters of the decision function (parameters that do not change from image to image but are either constant or quasi-static in that their values may be refined over time, as mentioned above) along with the calculated values from 11, and then a module (or corresponding step) 12*b* determines the suitable format using the table 12*c* of thresholds versus formats. After the format to be used is determined, a module (or corresponding step) 14 reencodes the input color-quantized image to produce an output formatted image using the format determined by the invention.

The form of the decision function is not fixed by the invention. For example, instead of using eq. (1) for the decision function, in the case where an image is to be classified as a photograph (i.e. a natural image) if two conditions are met, namely that first the number c of colors be above some minimum level given by α, and second that the average run length r be less than some maximum level given by β, the decision function can be expressed as, $$f(c, r) = \begin{cases} 0 & \text{for } c > \alpha \text{ and } r < \beta \\ 1 & \text{otherwise} \end{cases} \tag{3}$$

where α is therefore a color threshold and β is therefore a run length threshold. The table of threshold values versus formats would then be set up so that for f(c,r)=0, the format for a natural image would be selected, for example the JPEG format, and for f(c,r)=1, the format for a graphic image would be selected, such as GIF.

The Invention Assuming the Input Image is of Arbitrary Format (and so not Necessarily Color-Quantized)

As described above in connection with FIG. 1, the input to the analysis module 11 is an image already encoded according to GIF, i.e. it is a color-quantized image. The invention then determines whether such an image should be kept as a GIF or re-encoded as a JPEG formatted image based on the "naturalness" of the image. If the input image is a JPEG instead of a GIF, i.e. the image is not color-quantized, then the analysis module 11 cannot perform the analysis described above (to determine c,r,d), at least not without some preprocessing.

Again referring to FIG. 1, the invention therefore provides an optional preprocessing module 15 that receives as an input an input formatted image and that, when operatively engaged, either provides an input color-quantized image for analysis and possible reencoding as described above, or provides to the reencoder 14 an image and instructions for reencoding according to either GIF or JPEG format, bypassing the above-described analysis and decision modules 11 12. Whether or not the preprocessing module performs any actual preprocessing, it serves as a source of the image to be reencoded by the reencoder 14 if re-encoding is decided on by the invention, or as a source of the image to be provided by the re-encoder 14 as the output formatted image without any re-encoding, i.e. so that the re-encoder acts as a pass-through, without performing any re-encoding; thus, the image provided may be the original input formatted image (in which case the preprocessing module 15 is a pass-through), or the image provided to the reencoder 14 may be some image derived from the original input formatted image. If the preprocessing module 15 is not operatively engaged, the input formatted image must be a color-quantized image, and the output of the preprocessing module in this case (in which the preprocessing module is a pass-through) is the original input formatted image, redesignated as an input color-quantized image.

Figure 4:
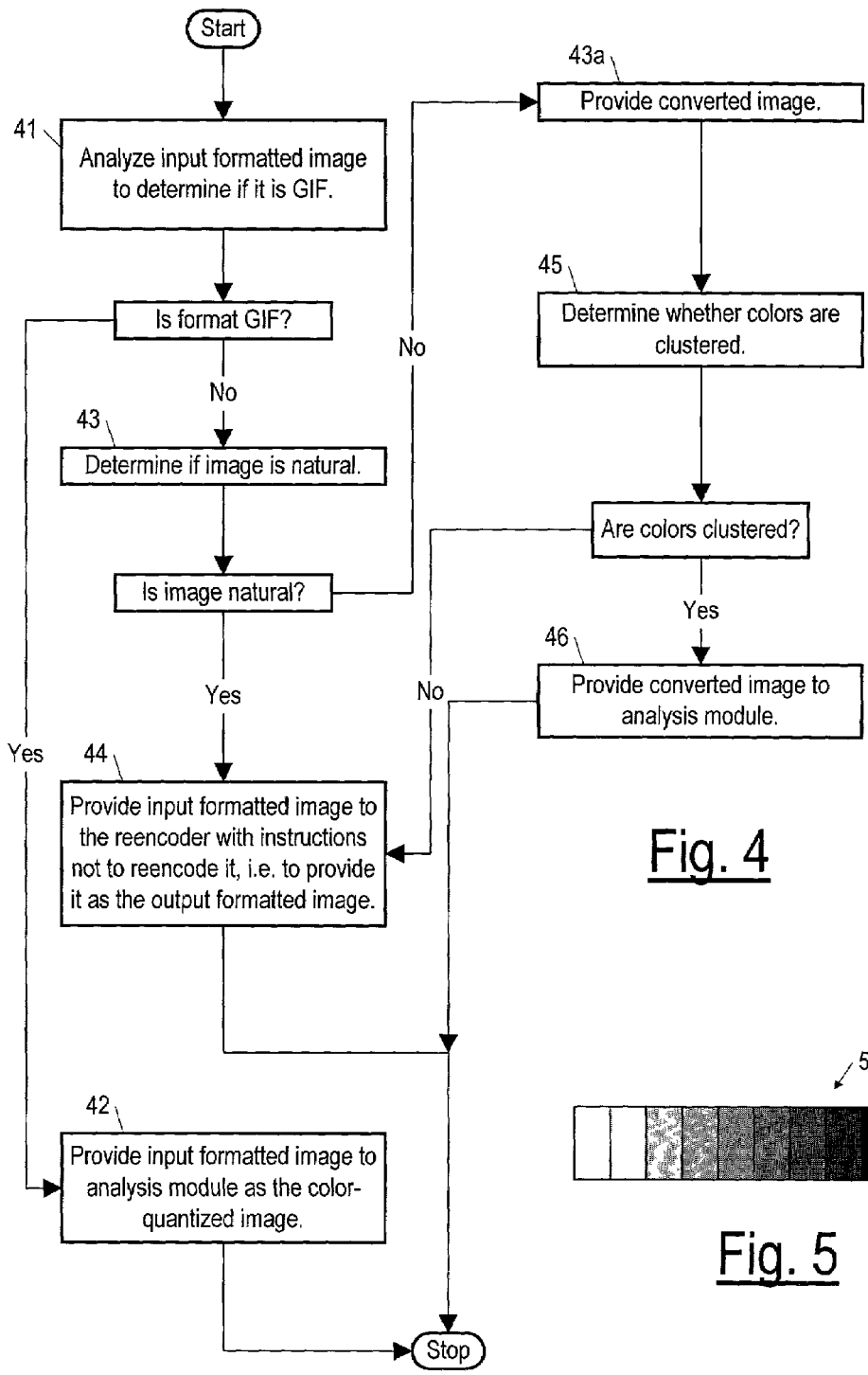
FIG. 4 is a block/flow diagram of an extension of the invention, for preprocessing an input image of unknown format.

Referring now to FIG. 4, the preprocessing module 15 (FIG. 1) is operative according to a procedure including a first step 41 in which the input formatted image is analyzed to determine whether it is a GIF image. If it is, then in a next step 42, the input formatted image is provided to the analysis module 11 as the input color-quantized image. If not, so that the input formatted image is a JPEG image, then in a next step 43, the preprocessing module 15 determines whether the JPEG image is a natural or artificial image, according to some metric used for measuring naturalness (a determination that cannot be made using the analysis module 11 since the image is not color-quantized). This is accomplished using the following procedure:

a) Scan the differentially encoded DC terms (i.e. terms corresponding to substantially constant color) present in the JPEG bit-stream, build a corresponding histogram, and then calculate the variance of the differentially encoded DC terms from the histogram.

b) If the variance is found to be above a predetermined threshold, then conclude that the image is natural.

If the image is deemed natural using the above procedure, then the image should remain in JPEG format. Consequently, no further preprocessing should be performed; the image should be kept in JPEG format, and the format selection process should be terminated. Thus, if the image is deemed natural, then in a next step 44, the input formatted image is provided to the re-encoder with instructions not to re-encode it and so to provide it as the output formatted image.

If the image is not deemed natural by the above procedure (i.e. if variance is found to be below the predetermined threshold so that the image cannot be categorized as natural using the above procedure), then in a next step 43*a* a converted image that is a pixel-domain representation (i.e. a color-quantized image) of the input formatted image is provided, and then in a next step 45, it is determined whether the colors of the converted image are clustered.

The processing according to the two steps 43*a* 45 determines whether or not the JPEG image was originally formed from a pixel domain image that was color-quantized. (If the colors of the converted image are determined to be clustered, then the JPEG image was originally formed from a pixel domain image that was color-quantized, i.e. a GIF image.)

In the first step 43*a* in determining whether the pixel-domain image that formed the basis of the JPEG compressed image was color quantized, an attempt is made to undo the quality reduction inherent in the baseline JPEG (the input formatted image), leading to the converted image (an estimated pixel-domain representation) provided in step 43*a* as follows.

a) For each block, assume that the higher-frequency components are missing, i.e. are not provided by the encoding because the format used is not the most suitable, and apply an algorithm that calculates the missing coefficients. Such deblurring algorithms are known in the art.

b) Having so estimated the missing coefficients, convert the image to a pixel-domain representation.

In the second step 45, as mentioned, the degree of color clustering is determined. Color clustering in an image suggests that the image may be artificial and reencoding as a GIF may be beneficial, and little or no clustering implies that the image is natural and so should be reencoded as JPEG. The second step 45 is performed as follows.

a) Use a color quantization scheme to determine a palette for the converted image. Heckbert's median cut color quantization scheme (algorithm) is known in the art and can be used for this purpose.

b) For each pixel of the converted image, or for a representative sample of the pixels, measure the difference between the ideal value (the value determined with infinitely fine quantization) and the color-quantized value.

c) From the measured differences, determine a measure of how clustered the colors are, based on the variance between the ideal and the quantized values.

If the colors are very clustered (the variance between ideal and quantized values is low according to some predetermined measure), then the image was probably color-quantized before being encoded as JPEG, and so in a next step 46, the converted image is provided as the input to the analysis module 11 to decide how to reencode it, as described above in connection with FIG. 1.

Figure 5:
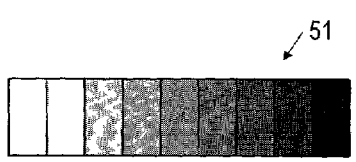
FIG. 5 is a gray scale chart plotting pixels taken from a reconstructed pixel domain image so that each pixel is located on the chart according to where it most closely matches the grayness of the chart.

Although one skilled in the art understands what is meant by indicating that colors of an image are clustered, i.e. the image is color-clustered, for definiteness the following explanation is provided. Imagine that, instead of colors (since colors are not shown in figures of a patent application), what is being described is whether gray-scale clustering occurs in an image. Refer now to FIG. 5, which shows a gray scale chart 51, and imagine that each pixel is taken from a reconstructed pixel domain image, i.e. the converted image output of 43*a*, and plotted on the gray scale chart 51, i.e. each pixel is located on the chart according to where it most closely matches the grayness of the chart. If the image was originally grayness-quantized with a palette size N, then the points where the pixels are located should congregate around N different points on the chart of FIG. 5. Each point around which pixels congregate corresponds to a grayness level in the original palette. In an actual application of the invention in the preferred embodiment, it is not just grayness, but color that is the subject of the analysis, and a cube is used as opposed to a two-dimensional grayness chart 51 since color space is three-dimensional.

If the colors are not (too) clustered (according to some predetermined metric, the threshold used in connection with the variance between ideal and quantized values), it is unlikely that the image was ever color-quantized, and so the image should be kept as a JPEG formatted image; therefore, if the colors are not (too) clustered, then in a next step that is the same as the previous step 44, the original JPEG formatted image is provided as the output, and no further processing or re-encoding is required.

In summary, the logic is as follows:

Is the input image a GIF? If so, then in a step 42, provide it to the analysis module 11 and stop preprocessing.

If not, then the input image is assumed to be a JPEG.

Is the DC variance above a predetermined threshold (i.e. is the image natural)? If so, then in a step 44, provide the input formatted image (a JPEG image) to the reencoder 12 with instructions not to re-encode the input formatted image, and stop preprocessing.

If not, then provide a converted image and measure clustering.

Are the colors of the converted image clustered? If not, then perform the step 44 in which the input formatted image is kept as is (a JPEG image), i.e. no further analysis or re-encoding is performed, and stop preprocessing. If so, then in a step 46, provide the converted image (a color-quantized image) to the analysis module 11, and stop preprocessing. Were it correct to equate lack of clustering with naturalness, in step 46, instead of providing the converted image to the analysis module 11, it would be provided to the re-encoder 14 with instructions to re-encode it as a GIF. However, the absence of significant clustering cannot always be equated with naturalness. For example, an image of a natural scene might have been color-quantized at some point (e.g. maybe while being captured using a low-quality camera attached to a personal computer), and then encoded as a JPEG. In this case the image is both clustered and natural. Ultimately because the content was a natural scene, the best format is JPEG. To arrive at this decision, in step 41 we check to see whether the image is a GIF (it is not, by assumption, it is instead a JPEG), then in step 43 we check to see if the image is natural. Since step 43 is only a very approximate way of making such a determination, assume for this example that the result is inconclusive. Then in step 45 we determine the clustering, and find that the image is clustered (since it was quantized at some point in its evolution, as described above). Therefore, in step 46 we use the quantized version (output of step 43a) to proceed with a more accurate analysis of the optimal format as provided by the analysis module 11.

In some applications, even if it is determined that an image should be re-encoded in another format, such re-encoding will not be carried out if other constraints are operative. For example, a mobile phone viewer may support only GIF, but not JPEG, and so the invention will not re-encode a GIF as a JPEG for such a phone, even though such re-encoding would be preferable. In addition, in some applications, even if the invention determines that an image originally encoded in a given format, such as GIF, should be kept in that format (i.e. re-encoding is not necessary), other requirements external to this invention, such as a requirement to reduce the size or resolution of the image, may cause re-encoding to take place even if, according to this invention, it is not required.

Use of the Invention

The invention can be incorporated for use in equipment connected to a communication system, equipment such as a mobile phone or other terminal equipment of a communication system, including for example a server in a computer network or at a website of the Internet.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method (10) for selecting a format in which to re-encode an input formatted image, the method characterized by:

an analysis step (11) of analyzing the input formatted image to provide information indicating whether characteristics of the input formatted image correspond to a natural image or to a graphic image; and a decision step (12) of deciding on and providing which format from among at least two predetermined formats to use to re-encode the input formatted image, based on the information indicating whether characteristics of the input formatted image correspond more to a natural image or more to a graphic image.

2. A method (10) as in claim 1 further characterized in that the analysis step (11) includes at least one of the following steps:

a step (11a) of examining the input to determine the number of colors;

a step (11b) of examining the input to determine the average run length of colors; and a step (11c) of examining the input formatted image to determine an edge detection metric.

3. A method (10) as in claim 2, further characterized in that the decision step (12) uses a predetermined function (f) having as an input one or more values corresponding to the information indicating whether characteristics of the input formatted image correspond more to a natural image or more to a graphic image, and also uses at least one threshold value to decide between the at least two predetermined formats and to arrive at a decision as to which of the predetermined formats to use to reencode the input formatted image.

4. A method (10) as in claim 3, further characterized in that the decision function (f) is a function f(c,r,d) able to be expressed as:

$$f(c, r, d) = \frac{\alpha}{c} + \beta r + \lambda d,$$

where c is the number of colors of the input formatted image, r is its average run length, and d is an edge activity metric for the input formatted image, and where $\alpha$, $\beta$ and $\lambda$ are predetermined values, not necessarily non-zero.

5. A method (10) as in claim 3, further characterized in that the decision function (f) is a function f(c,r,d) able to be expressed as:

$$f(c, r) = \begin{cases} 0 & \text{for } c > \alpha \text{ and } r < \beta \\ 1 & \text{otherwise} \end{cases}$$

where c is the number of colors of the input formatted image and r is its average run length, and where α and β are predetermined values, not necessarily non-zero.

6. A method (10) as in claim 3, further characterized in that the at least two predetermined formats include the JPEG format and GIF.

7. The method of claim 1, further characterized by: a preprocessing step (15), responsive to the input formatted image, of determining whether the input formatted image was formed from an original color-quantized image, for providing to the analysis step (11) either the input formatted image or a converted image derived from the input formatted image as the input formatted image.

8. The method of claim 7, further characterized in that the preprocessing step (15) includes a step (43) of determining the naturalness of the input formatted image by scanning differentially encoded DC terms of the input formatted image and comparing the variance of the DC terms to a predetermined threshold.

9. The method of claim 7, further characterized in that the preprocessing step (15) includes a step (45) of determining whether colors of a converted image derived from the input formatted image are clustered so as to determine whether the input formatted image was derived from a color-quantized image.

10. An apparatus (10) for selecting a format in which to re-encode an input formatted image, the apparatus characterized by:
an analysis module (11) for analyzing the input formatted image to provide information indicating whether characteristics of the input formatted image correspond to a natural image or to a graphic image; and
a decision module (12) of deciding on and providing which format from among at least two predetermined formats to use to re-encode the input formatted image, based on the information indicating whether characteristics of the input formatted image correspond more to a natural image or more to a graphic image.

11. An apparatus (10) as in claim 10 further characterized in that the analysis module (11) includes at least one of the following modules:
a module (11a) for examining the input to determine the number of colors;
a module (11b) for examining the input to determine the average run length of colors; and
a module (11c) for examining the input formatted image to determine an edge detection metric.

12. An apparatus (10) as in claim 11, further characterized in that the decision module (12) uses a predetermined function (f) having as an input one or more values corresponding to the information indicating whether characteristics of the input formatted image correspond more to a natural image or more to a graphic image, and also uses at least one threshold value to decide between the at least two predetermined formats and to arrive at a decision as to which of the predetermined formats to use to reencode the input formatted image.

13. An apparatus (10) as in claim 12, further characterized in that the decision function (f) is a function f(c,r,d) able to be expressed as:

$$f(c, r, d) = \frac{\alpha}{c} + \beta r + \lambda d,$$

where c is the number of colors of the input formatted image, r is its average run length, and d is an edge activity metric for the input formatted image, and where α, β and λ are predetermined values, not necessarily non-zero.

14. An apparatus (10) as in claim 12, further characterized in that the decision function (f) is a function f(c,r,d) able to be expressed as:

$$f(c, r) = \begin{cases} 0 & \text{for } c > \alpha \text{ and } r < \beta \\ 1 & \text{otherwise} \end{cases}$$

where c is the number of colors of the input formatted image and r is its average run length, and where α and β are predetermined values, not necessarily non-zero.

15. An apparatus (10) as in claim 12, further characterized in that the at least two predetermined formats include the JPEG format and GIE.

16. The apparatus of claim 10, further characterized by: a preprocessing module (15), responsive to the input formatted image, for determining whether the input formatted image was formed from an original color-quantized image, for providing to the analysis module (11) either the input formatted image or a converted image derived from the input formatted image as the input formatted image.

17. The apparatus of claim 16, further characterized in that the preprocessing module (15) includes a module (43) for determining the naturalness of the input formatted image by scanning differentially encoded DC terms of the input formatted image and comparing the variance of the DC terms to a predetermined threshold.

18. The apparatus of claim 16, further characterized in that the preprocessing module (15) includes a module (45) for determining whether colors of a converted image derived from the input formatted image are clustered so as to determine whether the input formatted image was derived from a color-quantized image.

19. A mobile phone, characterized in that it includes an apparatus (10) as in claim 10.

20. Terminal equipment of a communication system, characterized in that the terminal equipment includes an apparatus (10) as in claim 10.

21. A computer server, characterized in that the computer server is responsive to computer instructions for performing the method (10) of claim 1.

* * * * *

UNITED STATES PATENT AND TRADEMARK OFFICE
CERTIFICATE OF CORRECTION

| | | |
|---|---|---|
| PATENT NO. | : 7,106,908 B2 | Page 1 of 1 |
| APPLICATION NO. | : 10/097185 | |
| DATED | : September 12, 2006 | |
| INVENTOR(S) | : Justin Ridge | |

It is certified that error appears in the above-identified patent and that said Letters Patent is hereby corrected as shown below:

In column 16, line 30, claim 15, line 3, delete "GIE" and substitute --GIF --.

Signed and Sealed this

Twenty-sixth Day of December, 2006

JON W. DUDAS
*Director of the United States Patent and Trademark Office*